Figure 1:
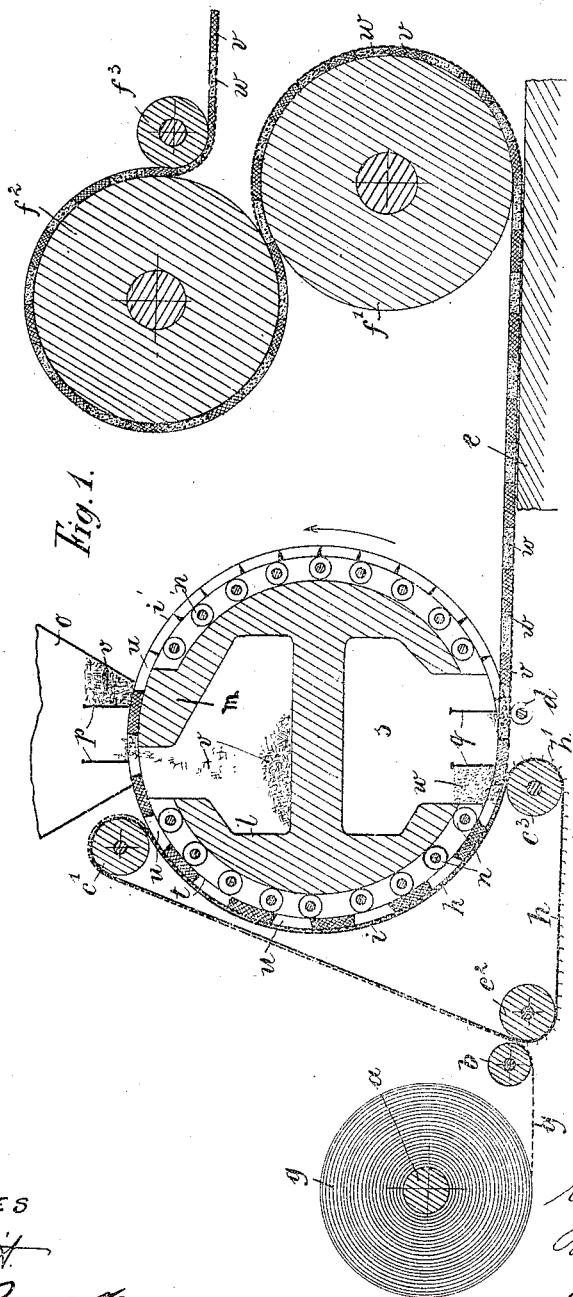

E. TRAEBER & R. HOLTKOTT.
MANUFACTURE OF LINOLEUM AND THE LIKE.
APPLICATION FILED AUG. 30, 1907.

949,863.

Patented Feb. 22, 1910.

WITNESSES

INVENTORS

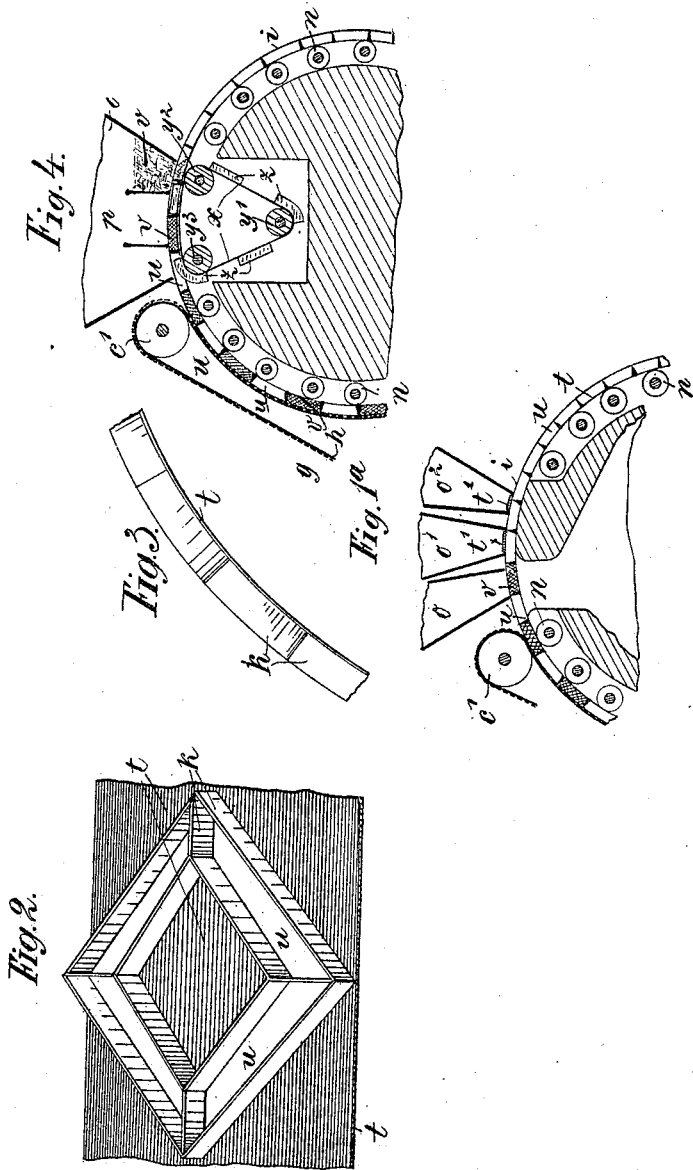

UNITED STATES PATENT OFFICE.

EWALD TRAEBER AND RICHARD HOLTKOTT, OF BADBURG, GERMANY.

MANUFACTURE OF LINOLEUM AND THE LIKE.

949,863.

Specification of Letters Patent. Patented Feb. 22, 1910.

Application filed August 30, 1907. Serial No. 390,812.

*To all whom it may concern:*

Be it known that we, EWALD TRAEBER and RICHARD HOLTKOTT, citizens of Germany, residing at Badburg, Germany, have invented new and useful Improvements in the Manufacture of Linoleum and the Like, of which the following is a specification.

Our invention relates to improvements in processes of manufacturing so-called "through and through" linoleum and the like, and in apparatus employed therein. According to prior methods of manufacturing such goods by means of molds or stencils, with the aid of which the differently colored compositions are applied to the fabric backing or foundation, a separate mold must be provided for every color. The differently colored compositions are applied in succession, by being fed into a mold, known as a "grating," into which the colored compositions are filled, one after the other, the mold being raised after being fully charged; or the compositions are deposited in unrestrained masses upon the backing. If with the first manner of manufacture only a single grating is employed, the linoleum is turned out extremely slowly, the working is not regular, and a calender for pressing the material cannot be used, since the grating must be stopped until the variously colored compositions are supplied in succession. The cost of the gratings is very considerable, so that if, on the other hand, as many gratings are employed as there are colors to be produced, in order to enable the composition to be more quickly applied, the expenses attending production of the pattern are greatly increased, depending upon the number of gratings used. With the second-mentioned method of manufacture, where the composition—one color after the other—is loosely distributed upon the foundation, serious drawbacks result. For the granular mass lying upon the backing fabric without any restraint spreads out over a larger surface than of the mold-figure, so that the various colors mix, producing a pattern with irregular edges, not extending right down to the backing.

According to our invention, we do not employ a separate mold for each color, but use for all colors a single mold, of which not merely, the perforated parts, but also the closed or unremoved pattern-portions are utilized for the application of the composition. For this purpose the latter parts are furnished with thin, vertical walls, the height of which corresponds to the thickness of layer in which the composition is to be applied. In proceeding, we prefer first to fill the required composition into the unremoved pattern-portions, and then to cover the mold with the backing fabric, upon which the composition is to be distributed. Hereupon the mold is inverted, and through the perforate pattern-portions of the mold the composition corresponding to the colors of these pattern-figures is now deposited upon the backing. The mold is then raised from the backing, the composition in those portions of the mold which are closed below, also remaining adhering to the backing. In carrying out the process either a flat or a cylindrical mold may be used, the advantage of the latter form being that it admits of continuous working.

The accompanying drawings illustrate, by way of example, one form of construction of cylindrical mold apparatus for carrying out our improved process.

Figure 1 is a vertical section through the main portions of the machine. Fig. 1ª is a vertical section through a fragment of a modified construction of the machine. Fig. 2 is a perspective view of a portion of the mold. Fig. 3 is a side elevation of a portion of the mold shown in Fig. 2. Fig. 4 is a vertical section through a fragment of a second modified construction of the machine.

The backing, $g$, upon which the composition to be distributed runs from the roller, $a$, over the roller, $b$, to the endless rubber apron or the like, $h$, provided with points, $h^1$, and running over rollers, $c^1$, $c^2$, $c^3$. This rubber apron presses the backing upon the round mold, $i$. The latter consists of a plate-metal cylinder, $t$, having spaces $u$ formed therein. As shown in Fig. 2 these spaces surround a rectangular portion $t$ of the cylinder and said spaces are inclosed by walls $k$, of sheet metal the height of which corresponds to the thickness the layer of composition is to have. The round mold $i$ receives guidance from a stationary frame, $l$, whose upper part constitutes a table, $m$, and which carries the guide rollers, $n$. The table, $m$, and rollers, $n$, support the rotary mold, insure its easy running and prevent its distortion.

The rubber apron, $h$, is furnished with points, $h^1$, and these act to keep the backing $g$ and mold $i$ in proper relation to each other and serve at the same time to advance the round mold. The latter has no special driving gear, but is rotated solely by the backing, $g$, being drawn forward by the calender and advancing the rubber apron, $h$, owing to its being engaged by the points $h^1$, of the latter, said points also carrying the molds around. This method is of great practical importance, for, as is well known, it is extremely difficult to bring the speed of a pressing calender into unison with that of the molds, etc.

Above the top of the walls, $k$, there is a stationary hopper, $c$, in which the two doctors, $p$, execute an oscillating movement in well-known manner. In the lower part, $s$, of the frame, $l$, there are likewise two doctors, $q$. The composition, $v$, which is to compose the pattern-figures, $t$, is charged into the hopper, $o$, and is filled into the compartments, $z$, $u$, by the doctors, $p$. The perforated mold-figures, $u$, are at first closed below by the table, $m$; as soon as the figures, $u$, however, through advance of the mold, $i$, leave the table, $m$, the composition, $v$, contained in them falls into the interior of the mold-cylinder. The mold, $i$, therefore, in its further course only carries the composition, $v$, in the compartments, $t$. This composition in the further passage of the mold is prevented from dropping out by the backing, $g$, which runs over the rollers, $c^1$, and $c^3$ and accompanies the mold, against which it lies firmly. The elastic rubber apron, $h$, at the same time presses the backing, $g$, somewhat into the compartments, $t$, whereby the loose mass, $v$, is lightly pressed together and prevented from shifting within the mold-compartments.

When in the course of rotation the mold, $i$, has nearly reached its lowest position, the perforated portions, $u$, will be filled from the interior, $s$, of the frame, $l$, with composition, $w$, which will be stroked off at the height of the mold walls by the doctors, $q$. The rubber apron, $h$, leaves the backing, $g$, at the roller, $c^3$, and the backing coated over its entire surface with the two masses, $v$, $w$, according to the pattern, will now travel on, over the roller, $d$, where it leaves the mold, $i$, and then onward over the table $e$ to the roller press, $f^1$, $f^2$, $f^3$. There the composition is compressed in well-known manner and pressed upon the backing. Instead of a roller press being used, the linoleum can naturally be compressed by flat presses. If it is desired to prevent the composition $v$, from entering the compartments, $u$, at all during filling of the compartments, $t$, the modification shown in Fig. 4 may be used. Instead of the table, $m$, a rotating plate, $x$, or the like is here provided, running over three rollers, $y^1$, $y^2$, $y^3$, and preventing elevations, $z$, corresponding to the perforations of the mold, $i$, into which they protrude.

If a more than two-color pattern is to be produced, this can be done by providing in the hopper, $o$, or in the interior of the chamber, $s$, of the mold, $i$, partitions which are disposed in the direction of travel of the mold, in order that the masses of different colors may be separated from each other. Or instead of this, several colored masses may be filled in from above and within the mold, $i$, in succession, by means of a plurality of hoppers, in such manner that those mold-compartments into which the particular color is not to be filled, are covered in well-known manner. One such arrangement is shown in Fig. 1$^a$. In place of a single hopper, $o$, two or more hoppers are located one behind the other, from left to right, $o$, $o^1$, $o^2$, etc. On the bottom of hopper, $o^2$, there is a plate, $t^1$, which rests upon the mold, $i$, but always remains in the same place. This plate covers those mold compartments which are not to be filled with the color from hopper, $o^2$, that is to say, those compartments, $t$, which are destined to receive the colors from hopper, $o$, $o^1$. Below the hopper, $o^1$, there is a like plate, $t^1$, which has only to cover the compartments, $u$, which are to be filled from hopper, $o$, for the compartments already filled from hopper, $o^2$, will not take up any more composition, being already full. The compartments, $u$, below hoppers, $o^2$, $o^1$, do not require to be covered, since they are perforated and the composition which they take up from, $o^2$, and $o^1$, like that from, $o$, after leaving the table, $m$, falls down into the space of the frame, $l$. The covering members of the plates, $t^1$, may conveniently be strips which in the direction of rotation of the mold are of the same length as the hoppers, $o^1$, $o^2$, $o^3$, are broad. The covering in the lower part, $s$, may be effected in precisely the same manner, except that here the number of colors must be limited to two, since composition can not be carried over the already filled compartments, as was the case with the hopper, $o^1$. For at the top, those particles of composition lying on the surface are those which subsequently constitute the underside of the linoleum, so that particles of another color may be scattered among them without disturbance of the pattern. But below, on the other hand, the upper side of the composition is at the same time the face of the linoleum. The arrangement can, however, be the reverse, if, $g$, is only employed as auxiliary fabric and the permanent backing fabric is only run in between mold and calender, $f$.

The new process can be employed not only in the manufacture of linoleum and similar materials, but also in making other articles, such as wall-coverings, of paper-stuffs, paper, floor-coverings of rubber and the like, mosaic, slabs, etc.

The costs attending the manufacture of molds being considerable, it is desirable to limit the number of such as far as possible. This can be done according to our invention by composing the mold from a number of small uniform cells open at tops and at bottom and by making the bottoms of the closed mold-compartments of removable disks, plates, or the like, instead of their being fixed. In this manner by changing the removable closures of the single cells according to the intended pattern one and the same mold can be used for the production of a large number of different patterns.

Having thus described our invention, we claim as new:

1. The herein described method of manufacturing patterned linoleum and the like which consists in supplying a suitable material of one character to all the compartments, of a mold having both bottomed and bottomless compartments and permitting the material to drop through the bottomless compartments, and applying a backing-sheet to and reversing the mold, filling the remaining compartments of the mold with material of another character, and then removing the material from all of the compartments upon the backing sheet.

2. An apparatus for making patterned linoleum and the like, comprising a mold having bottomed and bottomless compartments, means for supplying material of a certain color or character to all of the compartments of the mold, whereby the bottomed compartments are filled and the material drops through the bottomless compartments, means for applying a backing to the mold, means for inverting the mold, and means for supplying material to the remaining mold compartments.

3. In combination, a suitable support or carrier, an endless mold carried thereby having bottomed and bottomless compartments, means for supplying material of one character to all of the compartments of the upper portion of the endless mold, said carrier having a space into which the material drops from the bottomless compartments, means for applying a backing sheet to the endless mold after the bottomed compartments have been filled, and means for filling material of another character into the unfilled compartments upon the backing sheet.

4. In combination a carrier having upper and lower compartments, an endless traveling mold having bottomed and bottomless compartments and adapted to travel around said carrier, said compartments of the carrier being passed successively by the mold in its movement, a hopper for delivering material to the compartments of the mold at the top of the carrier, means for applying a flexible backing strip to the endless mold after it leaves said hopper, means for causing material to be fed from the lower compartment of the carrier, into the unfilled mold compartments against the backing sheet, and means for leading the backing sheet away from the mold with the material applied thereto.

5. In combination a carrier having upper and lower compartments, an endless traveling mold having bottomed and bottomless compartments and adapted to travel around said carrier, said compartments of the carrier being passed successively by the mold in its movement, a hopper for delivering material to the compartments of the mold at the top of the carrier, means for applying a flexible backing strip to the endless mold after it leaves said hopper, an endless device for holding said backing sheet pressed against the mold during a portion of its travel, means for causing material to be fed from the lower compartment of the carrier, into the unfilled mold compartments against the backing sheet, and means for leading the backing sheet away from the mold with the material applied thereto.

In testimony whereof we have signed our names to this specification in the presence of two subscribing witnesses.

EWALD TRAEBER.
RICHARD HOLTKOTT.

Witnesses:
 LOUIS VANDORN,
 M. KNEPPERS.